(12) United States Patent
Andersson

(10) Patent No.: US 6,907,121 B1  
(45) Date of Patent: Jun. 14, 2005

(54) IMPEDANCE MATCHED HORN HAVING IMPEDANCE MATCHED TO IMPEDANCE OF AN EAR

(75) Inventor: Jonas Andersson, Lund (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 512 days.

(21) Appl. No.: 09/594,816

(22) Filed: Jun. 16, 2000

(51) Int. Cl.[7] .............................................. H04M 1/00
(52) U.S. Cl. .............................................. 379/433.02
(58) Field of Search ................. 379/433.02, 433.01, 379/430; 455/90.3, 575.1, 90, 575; 361/683

(56) References Cited

U.S. PATENT DOCUMENTS 2,109,761 A * 3/1938 Warnke ................. 379/433.01
5,963,640 A * 10/1999 Rabe ..................... 379/433.02
6,064,894 A     5/2000 Zurek et al.
6,134,336 A * 10/2000 Clark .................... 379/433.02
6,321,070 B1 * 11/2001 Clark et al. .................. 455/90
6,381,126 B1 *  4/2002 Yoshimoto et al. ......... 361/683

FOREIGN PATENT DOCUMENTS

DE        19639300 A1    7/1997
GB           230876     10/1923
GB       2 327 321 A1    1/1999

* cited by examiner

*Primary Examiner*—Jack Chiang
(74) *Attorney, Agent, or Firm*—Potomac Patent Group PLLC

(57) ABSTRACT

An acoustic horn has an acoustic impedance matched with impedances of an ear and a driver. The acoustic horn can be used in an electroacoustic transducer including the driver, and the acoustic horn. The electroacoustic transducer is particularly well-suited for use in portable device such as a radiotelephone, pager, or other device.

19 Claims, 1 Drawing Sheet

IMPEDANCE MATCHED HORN HAVING IMPEDANCE MATCHED TO IMPEDANCE OF AN EAR

TECHNICAL FIELD OF THE INVENTION

The present invention relates to an impedance matched horn and, more particularly, to an impedance matched horn having an impedance matched to an impedance of an ear.

BACKGROUND AND SUMMARY

Typically, radiotelephones include a main body having a receiver or speaker housed in an upper portion thereof and oriented to direct sound directly through an outer housing into the user's ear. The overall quality of speech and sound emitted by the receiver of a radiotelephone is sometimes referred to as speech intelligibility. It is an objective in devices such as radiotelephones to minimize size and weight without compromising speech intelligibility.

Speech intelligibility in radiotelephones is generally affected by a number of design factors including the receiver design, how and where the receiver is housed, and how the emitted sound energy is channeled to the ear. Ideally, a radiotelephone should produce a fairly level frequency response for a frequency range of approximately 300 Hz to 3000 Hz.

Factors such as interference from electrical components in radiotelephones presents restrictions on the design of receivers. U.S. Pat. No. 5,963,640, the disclosure of which is incorporated by reference, discloses the use of an acoustical waveguide coupled to a speaker to permit mounting of the speaker at a point remote from sound ports that are intended to be placed proximate a user's ear and thus increase design flexibility. Nonetheless, receivers are designed in view of the impedance of free air, certain design features available in larger receiver systems such as loudspeakers and conventional telephones are not adapted to be used in receivers for radiotelephones. The impedance of free air necessitates that large volumes of air be moved to generate sufficiently intelligible sound. Accordingly, relatively large drivers are necessary to match the impedance of free air. This, in turn, presents limits in terms of the size, weight, and type of equipment that can be used, and how and where it can be located in a radiotelephone.

For example, although impedance matched horns matched to the impedance of the driver and free air are quite effectively used in large systems, the impedance of air requires such horns to be of sizes too great for use in smaller devices such as radiotelephone receivers. While various prior art radiotelephone devices, such as those disclosed in U.S. Pat. No. 5,915,015, U.S. Pat. No. 5,832,079, and WO98/51122, the disclosures of which are incorporated herein by reference, disclose the use of horns in connection with microphones, providing impedance matched horns in these devices must necessarily involve matching impendence with the impedance of free air as the speaker's mouth is typically held at a distance from the mouthpiece apertures. Accordingly, providing a horn arrangement in such devices presents a restriction on the size of the radiotelephone. U.S. Pat. No. 5,832,079 discloses that acoustic reciprocity dictates that the disclosed combination of an impedance matched horn and microphone is equally applicable to routing of output sound from interiorly mounted electromagnetic transducers to an output acoustic horn. However, such a horn and transducer would be of substantial size, just like the disclosed horn and microphone.

The present invention solves problems associated with prior art systems through the inventor's recognition that impedance of free air is not necessarily an appropriate design factor for consideration in radiotelephones. More particularly, the present invention relates to the inventor's discovery that, in receivers, it may be appropriate to match impedance of a horn to impedance of the driver and impedance of a user's ear instead of matching impedance to impedance of free air. This discovery results in permitting substantially smaller impedance matched horns and drivers than were previously known. Because the size of receivers including drivers and impedance matched horns can be substantially reduced according to the present invention, radiotelephone design flexibility is substantially improved, as the receivers are more easily isolated from potentially interference-using components, and the weight and size of radiotelephones can be reduced. Further, speech intelligibility need not be compromised and may be enhanced through the use of a receiver including a horn having impedance matched with the impedance of an ear.

In accordance with one aspect of the present invention, an acoustic horn has an acoustic impedance matched with impedances of an ear and a driver.

In accordance with another aspect of the present invention, an electroacoustic transducer includes a driver and an acoustic horn having an acoustical impedance matched with impedances of an ear and the driver.

In accordance with yet another aspect of the present invention, a portable device includes a body, a driver mounted inside the body, and an acoustic horn having an acoustical impedance matched with impedances of an ear and the driver, a large end of the horn extending to a position proximate an exterior surface of the body.

Beyond the patent literature, the published technical literature also provides useful description regarding the desirable attributes of exponential horns for sound propagation. In particular, a 1924 A.I.E.E. article authored by C. R. Hanna et al. is of interest for its teaching of the theoretical considerations pertaining to the design of acoustic horns for best sound propagation.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION OF PREFERRED EMBODIMENTS

Figure 1:
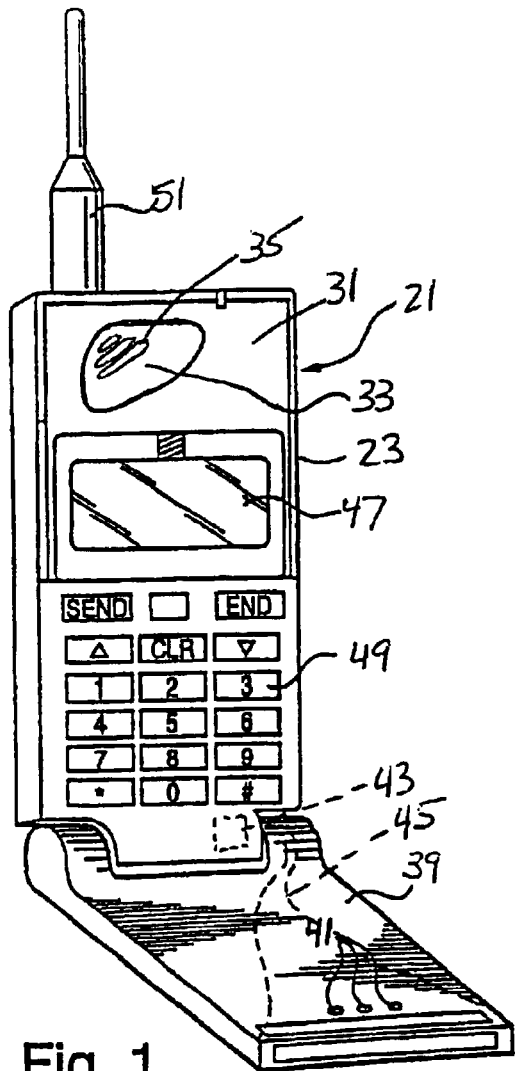
FIG. 1 is a perspective view showing a radiotelephone device according to an embodiment of the present invention.
Figure 2:
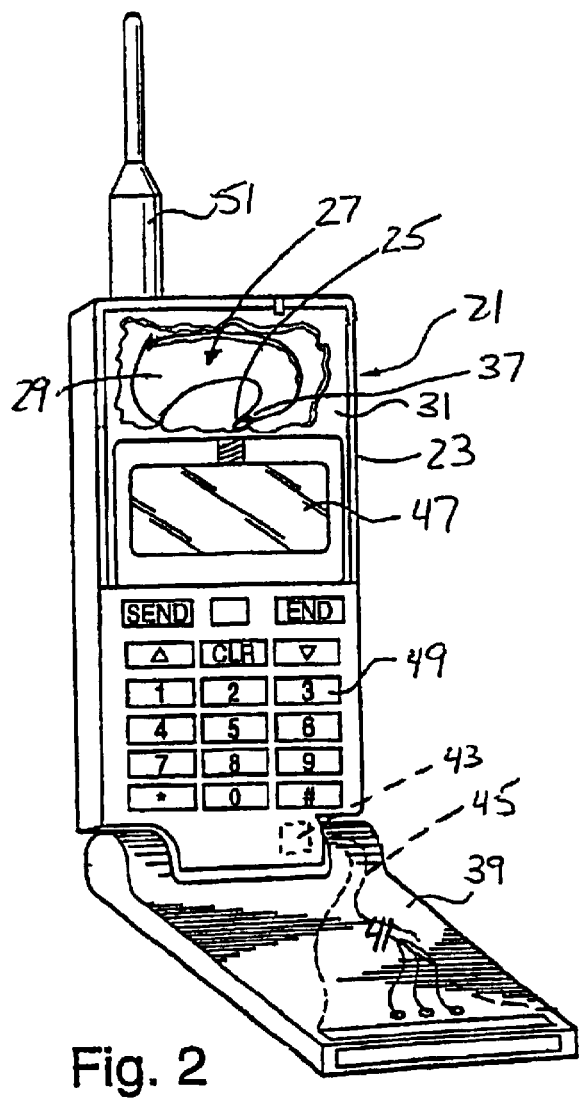
FIG. 2 is a perspective, partially broken view showing the radiotelephone device of FIG. 1 partially broken fashion to illustrate components of an electroacoustic transducer according to the present invention.

A portable device 21 according to an embodiment of the present invention is shown in FIGS. 1 and 2. The device 21 includes a body 23, a driver 25 mounted inside the body, and an acoustic horn 27. The horn 27 has an acoustical impedance matched with impedances of an ear and the driver 25. A large end 29 of the horn 27 extends to a position proximate an exterior surface 31 of the body 23. A plate 33, which is preferably simply part of the body 23, is preferably disposed proximate the large end 29 of the horn 27 and has one or more, preferably a plurality of holes 35 therein. The plate 33 assists in preventing external objects from being inserted in or falling into the horn 27. The horn 27 may be separate from the body 23 or may be integrally formed with the body, such as by being formed upon molding of a plastic body.

The driver 25 preferably includes a driving membrane 37. The driver 25 is preferably quite small, preferably on the order of 2 mm×1 mm×5 mm overall, although the driver may be larger or smaller as desired or necessary. The driving membrane 37 is also preferably quite small, preferably on the order of 1 mm or less in diameter, although larger or smaller driving membranes may be used as desired or necessary. For example, the driving membrane 37 may be on the order of 2 mm, 3 mm, 4 mm, 5 mm, etc., as desired or necessary. A preferred embodiment of the driving membrane 37 is circular but the driving membrane may be of any suitable shape, such as square, triangular, oval, etc., as desired or necessary.

The horn 27 has a cross-sectional area that generally increases from the small end proximate the driver 25 to the large end 29 proximate the exterior surface 31 of the body 23. The manner in which the sound pressure in the horn 27 varies can depend on the rate of growth of its cross-sectional area. This cross-sectional growth can be determined by the law under which the horn 27 expands. As an exponential device, the horn 27 can serve as an efficient impedance matching means between the source of the incident acoustic energy at the driver 25 and an ear positioned proximate the large end 29. Other acoustic horn types are contemplated for use in implementing the present invention. These can include horns of the conical type, parabolic type, hyperbolic type, plus other shapes and types.

Figure 3:
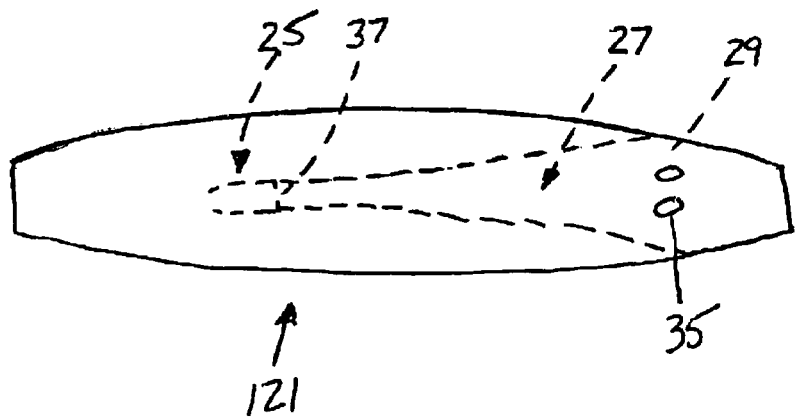
FIG. 3 is a perspective view showing another portable device according to an embodiment of the present invention.

The horn 27 is preferably also quite small, and is preferably on the order of 5 mm tall, 1 mm thick, and 34 mm wide at its widest dimension. The horn 27 may be of many different sizes and shapes. For example, the horn 27 may have a cross-sectional shape that is circular, oval, square, triangular, rectangular, or some combination of shapes, such as a polygon having flat side walls and curved top and bottom walls. The horn 27 may be substantially straight, such as is seen in FIG. 3, may be curved along its length, such as is seen in FIG. 2, or may have some other suitable shape along its length.

The horn 27 in combination with the driver 25 defines an electroacoustical transducer which will also on occasion be referred to generally as a receiver. The horn 27 is preferably designed to match the impedance of the driver 25 and the impedance of a user's ear, i.e., with the large end 29 of the horn or the plate 31 sealed against the ear or nearly sealed against the ear. The design of the horn 27 may be established using suitable instrumentation such as the Wideband Ear Simulator for Telephonometry—Type 4195, available from Brüel & Kjaer, DK-2850 Naerum, Denmark.

According to the embodiment shown in FIG. 1, the body 23 forms at least part of a telephone device, preferably a radiotelephone device. The radiotelephone device can be provided with other features conventional in radiotelephone devices such as a flip cover 39 into which a user is intended to speak and which is preferably provided with apertures 41 leading to a microphone 43. A horn 45, preferably an impedance matched horn, can be provided between the apertures 41 and the microphone 43. U.S. Pat. No. 5,915,015, U.S. Pat. No. 5,832,079, and WO98/51122 disclose horn arrangements in radiotelephone devices of types suitable for use in connection with the present invention and are incorporated by reference.

Other conventional features of the radiotelephone device can include a display unit 47, a control key section 49 with user-actuated key surfaces disposed in a key surface plane, and an antenna 51. Cellular phone units readily adapted for incorporating the unique features provided by the present invention are available in various model numbers from Ericsson Inc, Research Triangle Park, North Carolina, and Teiefonaktiebolaget L M Ericsson, Stockholm, Sweden.

By providing an impedance matched horn 27 according to the present invention in a receiver, it is possible to reduce the size of components used in radiotelephone receivers and other devices possessing receivers without compromising speech intelligibility. Moreover, the small size of the components used in the receiver according to the present invention facilitates arranging components in a portable or other device such that electrical interference between components is minimized. Further still, the small size of the components used in the receiver according to the present invention provides structural design flexibility not previously available in portable and other devices.

FIG. 3 shows an alternative embodiment of the present invention wherein the body 121 has an elongated shape. The body 121 may form at least part of a device such as a writing instrument, such as a pen or pencil. Apertures 35 can be provided in a side of the body 121 or, if desired or necessary, in an end of the body. It will be appreciated that an electroacoustic transducer according to the present invention can be incorporated into a number of different structures as desired. Other structures into which an electroacoustic transducer according to the present invention might be incorporated include personal computers, wireless devices such as pagers or so-called personal digital assistants or PALMPILOTs, and the like. Of course, if desired or necessary, the electroacoustic transducer according to the present invention can be incorporated into large devices, and is not limited to application in smaller devices of the type listed above.

While this invention has been illustrated and described in accordance with a preferred embodiment, it is recognized that variations and changes may be made therein without departing from the invention as set forth in the claims.

What is claimed is:

1. An electroacoustic transducer, comprising:
   a driver; and
   an acoustic horn having an acoustical impedance matched with impedances of an ear and the driver, wherein the acoustic horn has a cross-sectional area that generally increases in one of an exponential, conical, parabolic, and hyperbolic manner from a small end proximate the driver to a large end; and the acoustic horn is about 5 mm in length from the small end to the large end and is about 4 mm wide at the large end.

2. The electroacoustic transducer as set forth in claim 1, further comprising a plate disposed proximate the large end of the horn, the plate having one or more holes therein, and wherein the horn's cross-sectional area at the small end is less than the horn's cross-sectional area at the large end.

3. The electroacoustic transducer as set forth in claim 1, wherein the driver includes a driving membrane.

4. The electroacoustic transducer as set forth in claim 3, wherein the driving membrane has a diameter than 1 mm in diameter.

5. An acoustic horn having an acoustic impedance matched with impedances of an ear and a driver, wherein the acoustic horn has a cross-sectional area that generally increases in one of an exponential, conical, parabolic, and hyperbolic manner from a small end to a large end; and the acoustic horn is about 5 mm in length from the small end to the large end and is about 4 mm wide at the large end.

6. The acoustic horn as set forth in claim 5, further comprising a plate disposed proximate the large end of th horn, the plate having one or more holes therein, and wherein the horn's cross-sectional area at the small end is less than the horn's area at the large end.

7. A portable device, comprising:

a body;

a driver mounted inside the body; and an acoustic horn having an acoustical impedance matched with impedances of an ear and the driver, a large end of the horn extending to a position proximate an exterior surface of the body, and a small end of the horn being disposed proximate the driver, wherein the horn has a cross-sectional area that generally increases in one of an exponential, conical, parabolic, and hyperbolic manner from the small end to the large end; and the acoustic horn is about 5 mm in length from the small end to the large end and is about 4 mm wide at the large end.

8. The portable device as set forth in claim 7, further comprising a plate disposed proximate the large end of the horn, the plate having one or more holes therein, and wherein the horn's cross-sectional area at the small end is less than the horn's cross-sectional area at the large end.

9. The portable device as set forth in claim 8, wherein the plate is part of the body.

10. The portable device as set forth in claim 7, wherein the horn is integrally formed with the body.

11. The portable device as set forth in claim 7, wherein the driver includes a driving membrane.

12. The portable device as set forth in claim 11, wherein the driving membrane has a diameter less than 1 mm in diameter.

13. The portable device as set forth in claim 7, wherein the body forms at least part of a telephone device.

14. The portable device as set forth in claim 13, wherein the telephone device further includes a microphone arrangement.

15. The portable device as set forth in claim 7, wherein the body has an elongated shape.

16. The portable device as set forth in claim 15, wherein the body forms at least part of a writing instrument.

17. The portable device as set forth in claim 7, wherein the body forms at least part of a personal computer.

18. The portable device as set forth in claim 7, wherein the body forms at least part of a pager.

19. The portable device as set forth in claim 7, wherein the body forms at least part of a personal digital assistant.

* * * * *